US006785004B2

(12) United States Patent
Kersey et al.

(10) Patent No.: US 6,785,004 B2
(45) Date of Patent: Aug. 31, 2004

(54) METHOD AND APPARATUS FOR INTERROGATING FIBER OPTIC SENSORS

(75) Inventors: Alan D. Kersey, South Glastonbury, CT (US); Allen R. Davis, Falls Church, VA (US); Mark R. Fernald, Enfield, CT (US); Charles R. Winston, Glastonbury, CT (US); Timothy J. Bailey, Longmeadow, MA (US)

(73) Assignee: Weatherford/Lamb, Inc., Houston, TX (US)

( * ) Notice: Subject to any disclaimer, the term of this patent is extended or adjusted under 35 U.S.C. 154(b) by 185 days.

(21) Appl. No.: 09/726,059

(22) Filed: Nov. 29, 2000

(65) Prior Publication Data

US 2002/0063866 A1 May 30, 2002

(51) Int. Cl.[7] .............................. G01B 9/02; G01B 11/16
(52) U.S. Cl. ...................... 356/478; 356/35.5; 356/477; 385/12; 385/13
(58) Field of Search ................................ 356/35.5, 482, 356/478, 477, 480; 385/12–14, 15, 3

(56) References Cited

U.S. PATENT DOCUMENTS

| 3,149,492 A | 9/1964 | Weinberg ..................... 73/393 |
| 4,080,837 A | 3/1978 | Alexander et al. .......... 73/61 R |

(List continued on next page.)

FOREIGN PATENT DOCUMENTS

WO    WO 00/00799    of 1999

OTHER PUBLICATIONS

Kersey et al. "Fiber Grating Sensors" J. of Lightwave Technology, vol. 15, No. 8, Aug. 1997 pp 1442–1463.*

"Noise and Vibration Control Engineering Principles and Applications," Leo L. Beranek & Istvan L. Ver, A. Wiley Interscience Publication, pp. 537–541.

"Sound and Sources of Sound," A.P. Dowling & J.E. Williams, pp. 224–229.

"Speed and Flow Measurements by an Intelligent Correlation System," Frank Mesch, Advances in Instrumentation and Control, 45 (1990) Part 4, Research Triangle Park, NC, US.

(List continued on next page.)

*Primary Examiner*—Edward J. Glick
*Assistant Examiner*—Krystyna Suchecki
(74) *Attorney, Agent, or Firm*—Moser, Patterson & Sheridan

(57) ABSTRACT

An apparatus and method for interrogating fiber optic sensors non-intrusively sensing fluid flow within a pipe is provided. The apparatus includes a two-beam interferometer which comprises an optical circuit for generating a series of discrete light pulses that are directed at sensors positioned between pairs of low reflectivity fiber Bragg gratings. The successive light pulses are split into first light pulses and second light pulses, and the second light pulses are delayed a known time period relative to the first pulses. The first and second light pulses are combined onto a single optical fiber and directed through the low reflectivity gratings and the sensors positioned between the gratings. Reflected pulses from the series of pulses impinge on a photo receiver and interrogator, wherein the phase shift between the reflected first light pulses from a particular grating and the reflected second light pulses from the preceding grating, for each sensor are determined. Phase shifts from successive pulses for each sensor are compared, and a change in a measured parameter of the fluid is determined.

71 Claims, 5 Drawing Sheets

U.S. PATENT DOCUMENTS

| | | | |
|---|---|---|---|
| 4,445,389 A | 5/1984 | Potzick et al. ............ 73/861.27 |
| 4,515,473 A | 5/1985 | Mermelstein ................ 356/33 |
| 4,520,320 A | 5/1985 | Potzick et al. .............. 328/133 |
| 4,706,501 A | 11/1987 | Atkinson et al. ............. 73/730 |
| 4,896,540 A | 1/1990 | Shakkottai et al. ...... 73/861.02 |
| 4,932,262 A | 6/1990 | Wlodarczyk ........... 250/227.23 |
| 4,950,883 A | 8/1990 | Glenn ................... 250/277.14 |
| 4,976,151 A | 12/1990 | Morishita .................... 73/730 |
| 4,996,419 A | 2/1991 | Morey .................. 250/277.18 |
| 5,024,099 A | 6/1991 | Lee .............................. 73/730 |
| 5,031,460 A | 7/1991 | Kanenobu et al. ............ 73/730 |
| 5,040,415 A | 8/1991 | Barkhoudarian ............. 73/198 |
| 5,083,452 A | 1/1992 | Hope ......................... 73/61 R |
| 5,218,197 A | 6/1993 | Carroll .................. 250/227.19 |
| 5,317,576 A | 5/1994 | Leonberger et al. ........... 372/6 |
| 5,361,130 A * | 11/1994 | Kersey et al. ............... 356/478 |
| 5,363,342 A | 11/1994 | Layton et al. ............... 367/149 |
| 5,367,911 A | 11/1994 | Jewell et al. ............ 73/861.08 |
| 5,398,542 A | 3/1995 | Vasbinder ................... 73/40.5 |
| 5,401,956 A | 3/1995 | Dunphy et al. ........ 250/277.18 |
| 5,426,297 A | 6/1995 | Dunphy et al. ........ 250/227.23 |
| 5,440,932 A | 8/1995 | Wareham ..................... 73/730 |
| 5,493,390 A | 2/1996 | Varasi et al. ................... 356/32 |
| 5,513,913 A | 5/1996 | Ball et al. .................... 374/120 |
| 5,564,832 A | 10/1996 | Ball et al. .................... 374/161 |
| 5,591,922 A | 1/1997 | Segeral et al. ........... 73/861.04 |
| 5,657,405 A * | 8/1997 | Fujiwara ..................... 356/225 |
| 5,670,720 A | 9/1997 | Clark et al. ................... 73/730 |
| 5,680,489 A | 10/1997 | Kersey ........................ 385/12 |
| 5,708,211 A | 1/1998 | Jepson et al. ............ 73/861.04 |
| 5,741,980 A | 4/1998 | Hill et al. ................. 73/861.04 |
| 5,754,293 A * | 5/1998 | Farhadiroushan ........... 356/478 |
| 5,808,779 A | 9/1998 | Weis |
| 5,845,033 A | 12/1998 | Berthold et al. ............... 385/12 |
| 5,987,197 A * | 11/1999 | Kersey ........................ 385/24 |
| 5,991,026 A * | 11/1999 | Kluth et al. ............ 250/227.27 |
| 6,195,162 B1 * | 2/2001 | Varnham et al. ............. 356/453 |
| 6,212,306 B1 * | 4/2001 | Cooper et al. ......... 250/227.19 |
| 6,285,806 B1 * | 9/2001 | Kersey et al. ................ 385/12 |
| 6,450,037 B1 * | 9/2002 | McGuinn et al. ...... 250/227.19 |
| 6,466,706 B1 * | 10/2002 | Go et al. ...................... 385/12 |
| 2001/0013934 A1 * | 8/2001 | Varnham et al. ............. 356/478 |

OTHER PUBLICATIONS

"Mandrel–Wound Fiber Optic Pressure Sensor", P. Ogle and D. Gysling, United States Ser. No. 09/326,097 filed Jun. 4, 1999 (Docket CC–0067), pp. 1–26 with 4 sheets of drawings.

"Fiber Optic Sensors for Navy Applications", by A. Dandridge & G.B. Cogdell, IEE, Feb. 1991.

"Multiplexed fiber Bragg grating strain–sensor system with a fiber Fabry–Perot wavelength filter", by A. D. Kersey et al, Optics Letters, vol. 18, No. 16, Aug. 1993.

"A review of recent development in Fiber Optic Sensor Technology", by A. Kersey, SPIE, vol. 1586 Distributed and Multiplexed Fiber Optic Sensors (1991).

International Search Report for corresponding PCT application No. PCT/GB01/05293.

* cited by examiner

METHOD AND APPARATUS FOR INTERROGATING FIBER OPTIC SENSORS

BACKGROUND OF THE INVENTION

1. Technical Field

This invention relates to fluid flow sensing devices that use fiber optics and more particularly to those devices that measure the pressure variations within the pipe.

2. Background Information

In the petroleum industry, there is considerable value associated with the ability to monitor the flow of petroleum products in the production pipe of a well in real time. Historically, flow parameters such as the bulk velocity of a fluid have been sensed with venturi type devices directly disposed within the fluid flow. These devices have several drawbacks, including that they provide an undesirable flow impediment, are subject to the hostile environment within the pipe, and typically provide undesirable potential leak paths into or out of the pipe. In addition, these devices are only able to provide information relating to bulk fluid flow and are unable to provide information specific to constituents within a multi-phase flow.

Some techniques utilize the speed of sound to determine various parameters of the fluid flow within a pipe. One technique measures the amount of time it takes for sound signals to travel back and forth between ultrasonic acoustic transmitters/receivers (transceivers). This is sometimes referred to as a "sing-around" or "transit time" method. U.S. Pat. Nos. 4,080,837, 4,114,439, 5,115,670 disclose variations of this method. A disadvantage of this type of technique is that gas bubbles and/or particulates in the fluid flow can interfere with the signals traveling back and forth between the transceivers. Another disadvantage of this type of technique is that it considers only the fluid disposed between transceivers during the signal transit time. Fluid flow within a well is often non-homogeneous, for example, it may contain localized concentration variations ("slugs") of water or oil. The localized concentration variations may affect the accuracy of the data collected.

One prior art technique of sensing a parameter within a body is disclosed in U.S. Pat. No. 4,950,883 to Glenn wherein a broadband source is used in cooperation with a Fabry-Perot resonator sensor. The high reflectivity gratings establish a resonant signal, the wavelength of which is indicative of the parameter of interest of a fluid within the body. Among other shortcomings, this prior art method has limited usefulness in a downhole environment for several reasons, such as limited resolution and relatively slow update rates.

Multiphase flow meters can be used to measure the flow rates of individual constituents within a fluid flow (e.g., a mixture of oil, gas, and water) without requiring separation of the constituents. Most of the multiphase flow meters that are currently available, however, are designed for use at the wellhead or platform. A problem with utilizing a flow meter at the wellhead of a multiple source well is that the fluid flow reaching the flow meter is a mixture of the fluids from the various sources disposed at different positions within the well. So although the multiphase meter provides the advantage of providing information specific to individual constituents within a fluid flow (which is an improvement over bulk flow sensors), the information they provide is still limited because there is no way to distinguish from which well the fluid originates.

Acquiring reliable, accurate fluid flow data downhole at a particular source environment is a technical challenge for at least the following reasons. First, fluid flow within a production pipe is hostile to sensors in direct contact with the fluid flow. Fluids within the production pipe can erode, corrode, wear, and otherwise compromise sensors disposed in direct contact with the fluid flow. In addition, the hole or port through which the sensor makes direct contact, or through which a cable is run, is a potential leak site. There is great advantage in preventing fluid leakage out of the production pipe. Second, the environment in most wells is harsh, characterized by extreme temperatures, pressures, and debris. Extreme temperatures can disable and limit the life of electronic components. Sensors disposed outside of the production pipe may also be subject to environmental materials such as water (fresh or salt), steam, mud, sand, etc. Third, the well environment makes it difficult and expensive to access most sensors once they have been installed and positioned downhole.

What is needed, therefore, is a reliable, accurate, and robust apparatus for interrogating fiber optic sensors coupled to a pipe, that can determine minute sensor response to a fluid flow within a pipe that enables a high update rate, and that is operable in an environment characterized by long optical cable lengths.

SUMMARY OF THE INVENTION

It is, therefore, an object of the present invention to provide a method and apparatus for interrogating fiber optic sensors for sensing at least one parameter of the fluid flow within a pipe that is reliable and accurate, that can determine minute sensor response to a fluid flow within a pipe, that enables a high update rate, and that operates in an environment characterized by long transmission lengths and high temperatures and pressures.

According to the present invention, an apparatus for interrogating fiber optic sensors that are coupled to a pipe for non-intrusively sensing fluid flow within the pipe is provided. The apparatus includes a narrow band optical source producing a series of discrete pulses of narrow band light, a coupler to split the pulses into first and second pulses, a modulation device to impress a modulation carrier onto the first pulses, a time delay coil delaying the second pulses by a known amount of time, a coupler to recombine the pulses onto a single optical fiber, a first reflective grating positioned on one side of the sensor and a second reflective grating positioned on the opposite side of the sensor, an optical circulator to direct the pulses to a photo receiver to receive reflected pulses from the gratings, and an interrogator to compare the pulses. The present invention further includes the capability to interrogate a plurality of sensors along a single optical fiber string with each sensor positioned between a pair of reflective gratings.

The interrogator compares the phase shift between the reflected first pulses from the second grating with the reflected second pulses from the first grating to determine a change in magnitude of the measured parameter.

The narrow band light source emits pulses at a time interval between successive pulses that is short enough in duration to extract meaningful information from the sensors. At the same time, the interval between successive pulses is long enough to allow the reflected pulses to be properly distinguished. The time delay coil is advantageously sized to match the nominal length of the sensor. The reflected pulses will establish an interference pattern at the optical receiver, the intensity of which is based on the phase shift produced by the change in length of the sensor, which in turn is indicative of the magnitude of the sensed parameter.

An advantage of the present invention apparatus is that it enables long transmission lengths of optical fiber between the source and the sensors based on low loss elements and low reflectivity gratings. As a result, sensors may be placed at remote locations from instrumentation without the need for optical amplifiers.

Another advantage of the present invention is the ability to multiplex a plurality of sensors, each having a pair of gratings that reflect a single nominal wavelength. As a result, a plurality of sensors may be positioned along a single optical fiber. This enables a system that is insensitive to cross-talk, reduces optical fiber and equipment requirements, and permits installation in size-limited applications.

The foregoing and other objects, features, and advantages of the present invention will become more apparent in light of the following detailed description of exemplary embodiments thereof.

DETAILED DESCRIPTION OF THE INVENTION

Figure 1:
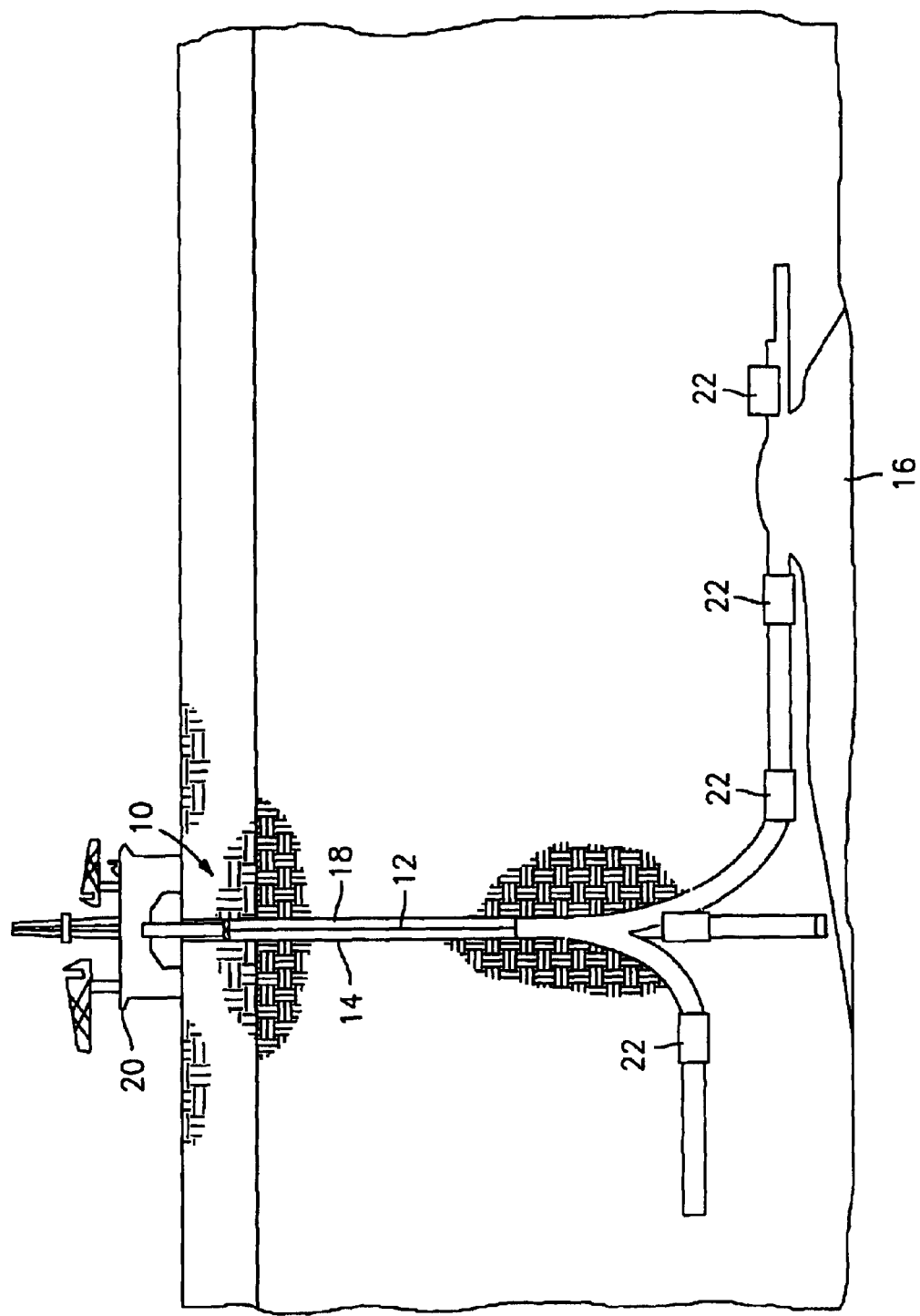
FIG. 1 is a diagrammatic view of a well having a casing and a pipe, and present invention flow meters positioned at various locations along the pipe inside the casing.

Referring to FIG. 1, there is shown an intelligent oil well system 10 containing one or more production pipes 12 that extend downward through a casing 14 to one or more petroleum sources 16. An annulus 18 is formed between the pipe 12 and the casing 14. Each production pipe 12 may include one or more lateral sections that branch off to access different petroleum sources 16 or different areas of the same petroleum source 16. The fluid mixture flows from sources 16 to the platform 20 through the production pipes 12. The fluid mixtures consist predominantly of petroleum products and water. The production pipe 12 includes one or more of the present invention apparatus 22 for non-intrusively sensing fluid flow within a pipe (also referred to hereinafter as a "flow meter") to monitor various physical parameters of the fluid mixtures as they flow through the production pipes 12.

Figure 2:
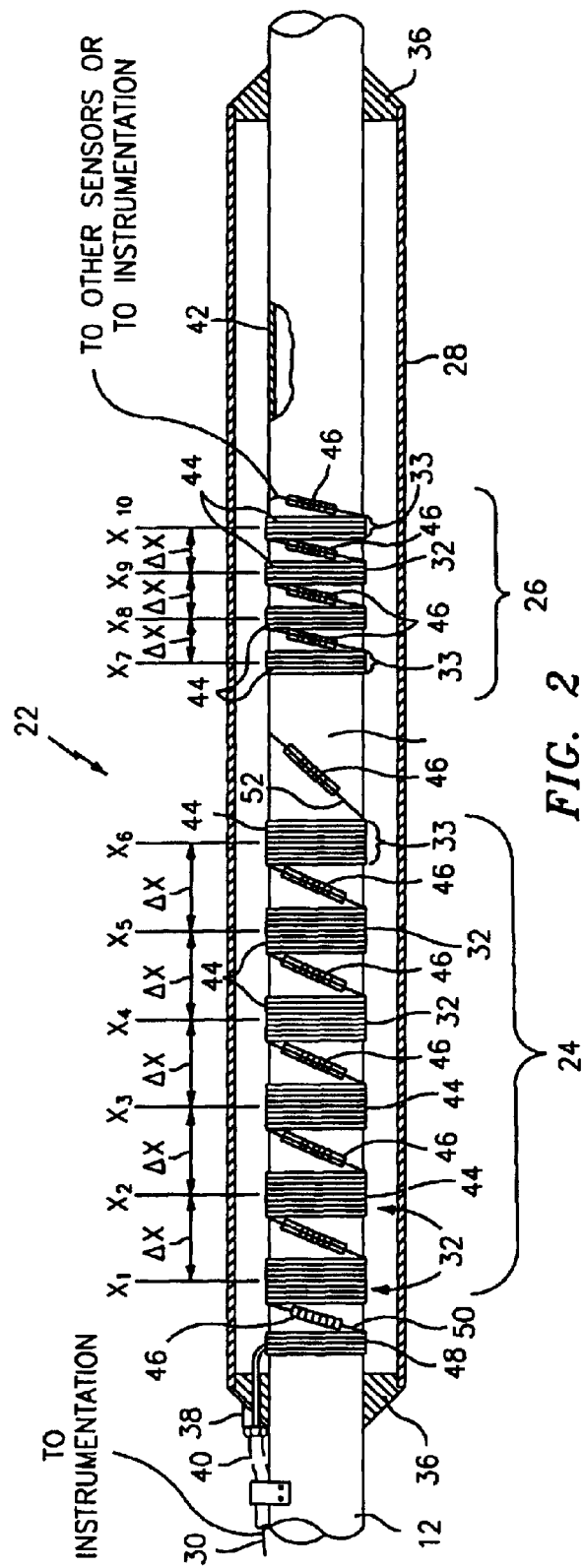
FIG. 2 is a diagrammatic view of an exemplary embodiment of the present invention for non-intrusively measuring fluid flow parameters within a pipe.

One embodiment of the present invention flow meter 22, as shown in FIG. 2, includes a first sensing array 24 for sensing acoustic signals traveling at the speed of sound (SOS) through the fluid within the pipe 12 (hereinafter also referred to as the "SOS sensing array"), a second sensing array 26 for sensing short duration local pressure variations traveling with the fluid flow (hereinafter also referred to as the "flow velocity sensing array"), and a housing 28 attached to the pipe 12 for enclosing the sensing arrays 24, 26. Each flow meter 22 can be incorporated into an existing section of production pipe 12 or can be incorporated into a specific pipe section that is inserted in line into the production pipe 12. The distributed scheme of flow meters 22 shown in FIG. 1 permits an operator of an intelligent well system 10 to determine the extent and location of breakthrough of water into the petroleum reserve. This information permits the operator to monitor and intelligently control production of the petroleum reserve.

Figure 3:
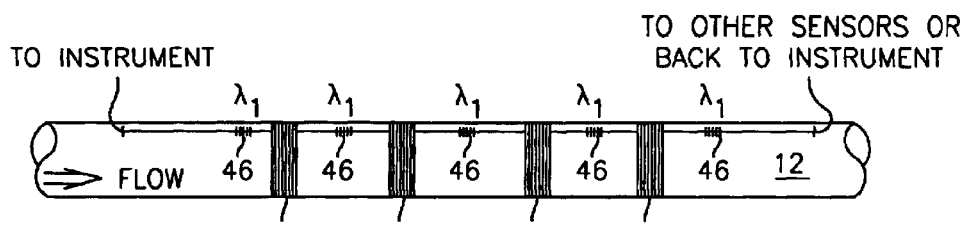
FIG. 3 is a diagrammatic view of an embodiment of sensing devices usable with the present invention.
Figure 4:
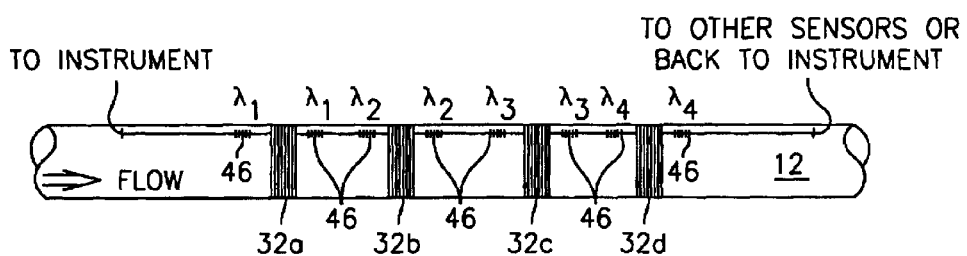
FIG. 4 is a diagrammatic view of an embodiment of sensing devices usable with the present invention.
Figure 5:
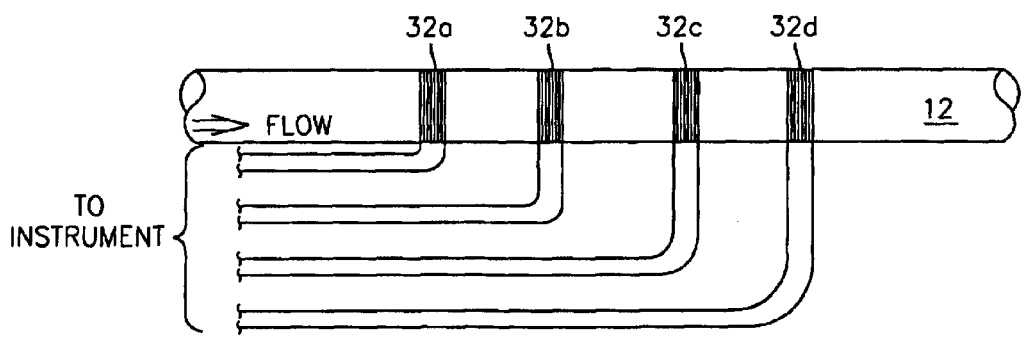
FIG. 5 is a diagrammatic view of an embodiment of sensing devices usable with the present invention.
Figure 6:
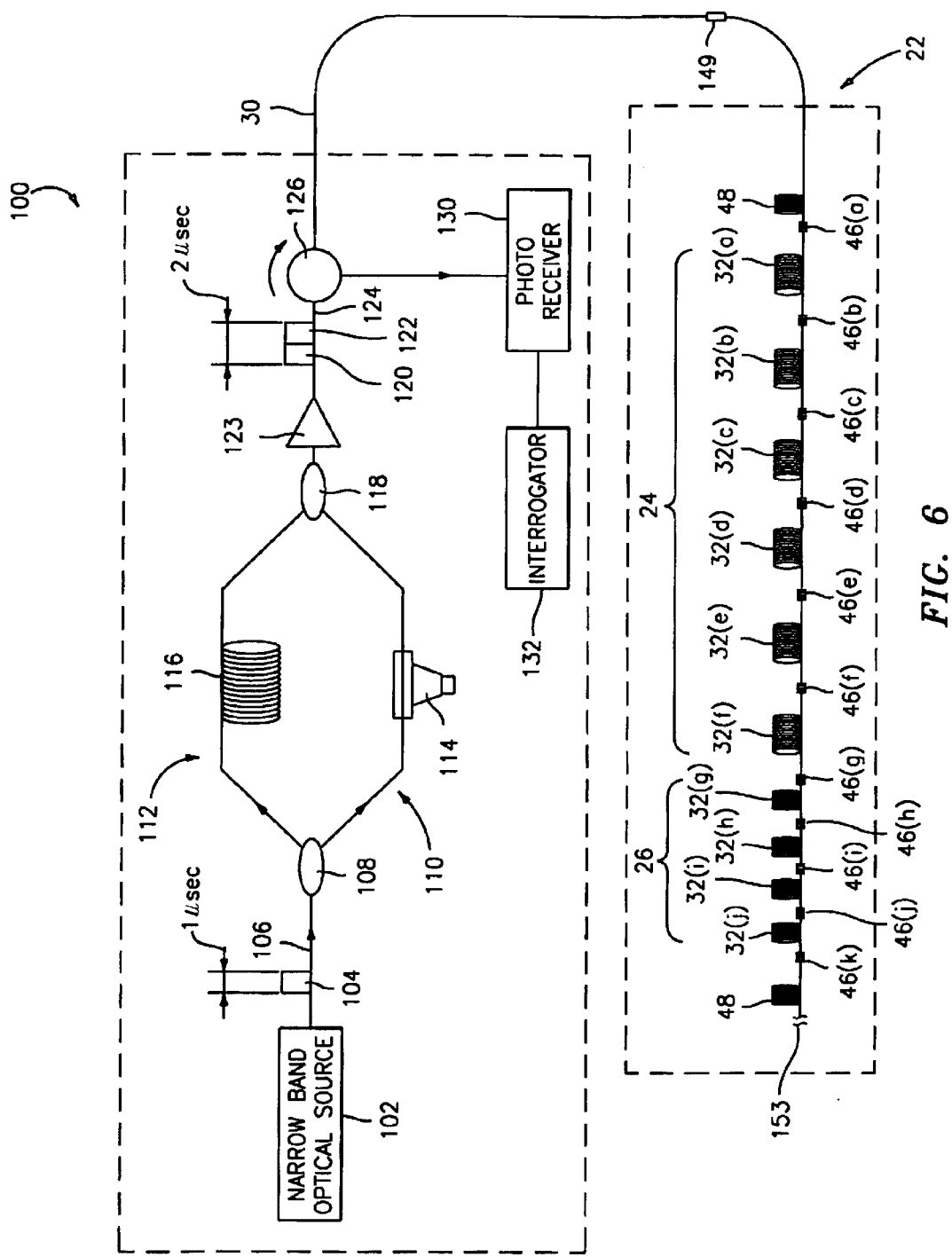
FIG. 6 is a block diagram of an instrument and apparatus for non-intrusively measuring fluid flow parameters within a pipe.

The sensing arrays 24, 26, as shown in FIG. 6, receive optical power and produce optical signals via fiber optic cables 30 that extend between the flow meter 22 and instrumentation 100 residing on the platform 20 or at a remote location in communication with the platform 20. Optical fiber pressure sensors 32 within each sensing array 24, 26 may be connected individually to the platform instrumentation or may be multiplexed along one or more optical fibers using known techniques including, but not limited to, wavelength division multiplexing (WDM) and time division multiplexing (TDM). The sensors 32 of sensing arrays 24, 26 may be connected to one another in series or parallel. The optical signals produced by the sensing arrays 24, 26 provide information relating to the fluid flow characteristics within the pipe 12 (e.g., local flow disturbances, acoustic wave propagation within the flow, flow pressure magnitude and changes, etc.). Interpretation of the optical signals, which can be performed using methods well known in the art, enables the determination of the speed of sound (SOS) of the fluid mixture and the velocity of the fluid flow within the pipe 12. Once the SOS, the flow velocity, the pressure, and the temperature of the mixture are known, other desirable data, such as the phase fraction of the constituents within the mixture, can be determined. The optical signals from the sensing arrays 24, 26 may also be interpreted using the methods disclosed in the following U.S. Patents, but are not limited to being used therewith: U.S. Pat. No. 6,435,030 to Gysling et al.; U.S. Pat. No. 6,463,813 to Gysling; U.S. Pat. No. 6,354,147 to Gysling et al.; and U.S. Pat. No. 6,450,037 to McGuinn, all of which are hereby incorporated by reference. FIG. 2 shows an exemplary embodiment of the present invention wherein the SOS sensing array 24 and the flow velocity sensing array 26 are positioned adjacent to one another on a common length of pipe 12. Further details of this embodiment are provided below, and FIGS. 3–5 diagrammatically illustrate sensing array embodiments and attributes that can be used with either or both sensing arrays 24, 26.

To avoid interference from outside sources and to protect from the harsh environment within the well, the sensing arrays 24, 26 may be enclosed within a housing 28 that is attached to an exterior surface of the pipe section 12. The housing 28 includes an outer sleeve extending between a pair of bosses 36. The fiber optic cable(s) 30 that extends between the flow meter 22 and the instrumentation 100 passes through a sealable port 38 in one or both bosses 36 and connects with the sensing arrays 24, 26. Outside the housing 28, the sensor cable 30 is housed in a protective conduit 40 that is attached to the pipe 12. In the preferred embodiment, the housing 28 and the pipe 12 together form a pressure vessel. The pressure within the pressure vessel may be greater than or less than the ambient pressure within the annulus 18 between the casing 14 and the pipe 12. In other embodiments, the housing 28 is sealed to protect the sensing arrays 24, 26, but does not act as a pressure vessel.

In all embodiments, the size and structure of the housing 28 are chosen to withstand the pressure gradients present in the well environment, to accommodate the size of the sensing arrays 24, 26, and to allow the sensing arrays 24, 26 to be positioned a distance away from the housing 28 such that heat transfer via the pipe 12 and/or the housing 28 is non-disabling for the application at hand.

In a preferred embodiment, the housing 28 is filled with a gas such as, but not limited to, air, nitrogen, argon, etc. The gaseous environment within the housing 28 advantageously acts as an acoustic isolator to help reduce pressure wave interference that might otherwise travel into the housing 28 from the annulus 18 and undesirably influence the sensing arrays 24, 26. The gaseous environment also thermally insulates the sensing arrays 24, 26.

In some applications, there is advantage in placing a plurality of bumpers within the housing to help maintain separation between the outer sleeve of the housing and the pipe. U.S. patent application Ser. No. 09/740,757, filed on Nov. 29, 2000, discloses bumpers that can be used in this manner and is hereby incorporated by reference.

The pipe section 12 has a compliancy selected to suit the application at hand. The pipe 12 must have sufficient structural integrity to handle the pressure gradient across the pipe 12, and yet must also be able to deflect (i.e., change in circumference) by an amount that will yield useful information. The amount the pipe 12 will change in circumference for a given pressure distribution is determined by the thickness of the pipe wall 42 and the physical properties of the pipe material (e.g., modulus of elasticity, etc.). Thus, the thickness of the pipe wall 42 and the pipe material can be chosen to help produce favorable sensor sensitivity for the present apparatus. The characteristics of the pipe section 12 contiguous with each present apparatus may be the same as or different than the characteristics in other sections of the production pipe 12.

The optical pressure sensors 32 used in the SOS and flow velocity sensing arrays 24, 26 each include a plurality of optical fiber coils 33. Each coil 33 is wrapped one or more turns around the circumference of the pipe section 12 in a manner that allows the length of the optical fiber within the coil 33 to change in response to a change in the circumference of the pipe 12. If, for example, a pipe 12 can be expected to see a maximum circumferential change of "y", then a one-turn coil will be subject to a maximum potential change in length of "y" (or some known function of "y"). If an optical measurement technique is not sensitive enough to register a change in distance equal to "y", then the coil 33 can be wrapped to include "n" number of turns. The change in fiber length "y" per turn is therefore multiplied by "n" turns, and a change in fiber length great enough to produce a useful signal (i.e., "n·y") is provided. In fact, the same technique can be used to not only provide a minimum useful signal, but also to increase the sensitivity of the sensor 32 and therefore the range of detectable changes in the circumference of the pipe 12. In all cases, the length of the optical fiber in each coil 33 is known and is chosen to produce the sensitivity required to sense the disturbance(s) of interest for that particular sensor. The preferred embodiment, as described above, includes coils 33 wrapped around the circumference of the pipe 12. Alternatively, the optical fiber lengths can be arranged around a portion of the circumference of the pipe 12.

The turns of optical fiber in a sensor coil 33 are preferably laid next to one another to minimize the axial component of each turn, and thereby keep each turn to a known, constant length. Alternatively, some or all the turns of a coil 33 could be separated from adjacent turns. A coil 33 can consist of a single layer of optical fiber turns or multiple layers of optical fiber turns, depending on the application. The coil 33 of optical fiber in each sensor 32 may be attached to the pipe 12 by a variety of attachment mechanisms including, but not limited to, adhesive, glue, epoxy, or tape. In a preferred embodiment, a tape having an adhesive substance attached to opposite surfaces of a substrate is used. The tape adheres to both the pipe 12 and the fiber and provides a smooth surface on which the fiber can be laid. Experience teaches that tape used on a rough surface helps to decrease microbend losses within the optical fiber.

In most embodiments, the optical pressure sensors 32 used in the SOS and flow velocity sensing arrays 24, 26 further include one or more optical reflective devices 46 disposed between coils 33 that are wavelength tunable. In a preferred embodiment, the optical reflective devices 46 are fiber Bragg gratings (FBGs). An FBG, as is known, reflects a predetermined wavelength band of light having a central peak reflection wavelength ($\lambda$b) and passes the remaining wavelengths of the incident light (within a predetermined wavelength range). Accordingly, input light propagates along the cable 30 to the coils 33 and the FBGs 46 reflect particular wavelengths of light back along the cable 30. Experience teaches that in most applications there is advantage to placing an isolation pad between each optical reflective device and the outer surface of the pipe to accommodate pipe growth and/or vibrations. U.S. Pat. No. 6,501,067 to Jones et al, discloses such an isolation pad and is hereby incorporated by reference.

In the embodiment of the present invention shown in FIG. 3, the sensors 32 are connected in series, a single FBG 46 is used between each of the sensor 32, and each FBG 46 has a common reflection wavelength $\lambda_1$. In the embodiment shown in FIG. 4, the sensors 32 are connected in series, and pairs of FBGs 46 are located along the fiber at each end of each of the sensors 32. The FBG pairs 46 are used to multiplex the sensed signals to identify the optical signals returned by each of the sensors 32. The pair of FBGs 46 on each end of the first sensor 32a have a common reflection wavelength $\lambda_1$, and the second pair of FBGs 46 on each end of the second sensor 32b have a common reflection wavelength $\lambda_2$, but different from that of the first pair of FBGs 46. Similarly, the FBGs 46 on each end of the third sensor 32c have a common reflection wavelength $\lambda_3$, which is different from $\lambda_1,\lambda_2$, and the FBGs 46 on each end of the fourth sensor 32d have a common reflection wavelength $\lambda_4$, which is different from $\lambda_1,\lambda_2,\lambda_3$. The sensors 32 within either sensing array 24, 26 may alternatively be connected to one another in parallel by using optical couplers (not shown) that are positioned upstream of each sensor 32 and coupled to a common fiber.

Referring to FIGS. 2, 3, and 4, the sensors 32 with the FBGs 46 disposed therebetween may be configured in numerous known ways to precisely measure the fiber length or change in fiber length, such as by interferometric, Fabry-Perot, time-of-flight, or other known arrangements. An example of a Fabry-Perot technique is described in U.S. Pat. No. 4,950,883 "Fiber Optic Sensor Arrangement Having Reflective Gratings Responsive to Particular Wavelengths," to Glenn. Alternatively, a portion or all of the fiber between the optical reflective devices 46 may be doped with a rare earth dopant (such as erbium) to create a tunable fiber laser, examples of which can be found in U.S. Pat. Nos. 5,317,576, 5,513,913, and 5,564,832, which are incorporated herein by reference.

Referring to FIG. 5, in an alternative embodiment, the sensors 32 may also be formed as a purely interferometric sensing array by using sensors 32 without FBGs 46 disposed therebetween. In this embodiment, each sensor 32 is independently connected to the instrumentation at the platform 20, and known interferometric techniques are used to determine the length or change in length of the fiber around the pipe 12 caused by pressure variations. U.S. Pat. No. 5,218,197, entitled "Method and Apparatus for the Non-invasive Measurement of Pressure Inside Pipes Using a Fiber Optic Interferometer Sensor," issued to Carroll, discloses such a technique. The interferometric wraps may also be multiplexed in a manner similar to that described in Dandridge et al. "Fiber Optic Sensors for Navy Applications," IEEE, February 1991, or Dandridge et al. "Multiplexed Interferometric Fiber Sensor Arrays," SPIE, Vol. 1586, 1991, pp. 176–183. Other techniques to determine the change in fiber length may also be used. In addition, reference optical coils (not shown) may be used for certain interferometric approaches and may also be located on or around the pipe 12 but may be designed to be insensitive to pressure variations.

Referring again to FIG. 2, adjacent sensors 32 within either sensing array 24, 26 are spaced apart from each another by a known distance or distances. The sensors 32 in the arrays are preferably equidistant from one another, but not necessarily. In both sensing arrays 24, 26, the spacing between adjacent sensors 32 and the number of sensors 32 reflect the nature of the signal being sensed. As noted, the SOS sensing array 24 senses acoustic signals having relatively long wavelengths, and the flow velocity sensing array 26 senses local pressure variations within the flow having relatively small coherence lengths. Accordingly, the sensors 32 in the SOS sensing array 24 are spaced apart from one another substantially further than are the sensors 32 within the flow velocity sensing array 26 because of the intrinsic differences in the signals being sensed. The exact interspacing and number of coils 33 of a sensor 32 in a sensing array 24, 26 is application dependent and is a function of parameters such as, but not limited to, the spectra of anticipated acoustic signals and local pressure variations, the anticipated SOS of the fluid constituents, the number of sensors 32, the processing technique used, etc. Examples of signal processing techniques can be found in the following references, which are incorporated herein by reference: H. Krim, M. Viberg, "Two Decades of Array Signal Processing Research—The Parametric Approach," IEEE Signal Processing Magazine, pp. 67–94, R. Nielson, "Sonar Signal Processing," Ch. 2, pp. 51–59.

Fiber optic cable 30 extending through the housing boss 36 connects to an optical delay line 48. An optical fiber 50, in turn, connects the optical delay line 48 to the SOS sensing array 24. The SOS sensing array 24 includes six (6) sensors 32 located at six predetermined locations ($x_1, x_2, x_3, x_4, x_5, x_6$) along the pipe 12, with each sensor 32 separated from adjacent sensors 32 within the array by an axial length increment equal to "$\Delta x$". As noted earlier, each sensor 32 is mounted on a tape that includes adhesive on both faces. A FBG 46 is positioned between the optical delay line 48 and a first sensor 32. One FBG 46 is also positioned between and connected to each pair of adjacent sensors 32, such that the optical delay line 48, the FBGs 46, and the sensors 32 in the SOS sensing array 24 are in series with one another. It is preferred, but not required, to skew each FBG 46 between the adjacent sensors 32 so as to minimize the sharpness of the directional changes of the fiber comprising the sensor 32 and the FBGs 46.

An optical fiber 52 extends from a last sensor 32 in the SOS sensing array 24 to a first sensor 32 in the adjacent flow velocity sensing array 26. A FBG 46 is disposed in-line between the two devices. The flow velocity sensing array 46 includes four (4) sensors 32 located at predetermined locations ($x_7, x_8, x_9, x_{10}$) along the pipe 12. Like the SOS sensing array 24, each sensor 32 in the flow velocity sensing array 26 is mounted on tape and is separated from adjacent sensor 32 within the flow velocity sensing array 26 by an axial length increment equal to "$\Delta x$". The axial distance $\Delta x$ separating the sensors 32 in the flow velocity sensing array 26 is, however, substantially shorter than that used in the SOS sensing array 24, as noted earlier. One FBG 46 is positioned between and connected to each pair of adjacent sensors 32, such that the FBGs 46 and the sensors 32 in the flow velocity sensing array 26 are in series with one another. Here again, it is preferred to skew each FBG 46 between the adjacent sensors 32 so as to minimize the sharp changes of the fiber comprising the sensor 32 and the FBGs 46. In some applications, it may be useful to connect an additional optical delay line 48 after the last sensor 32 within the flow velocity sensing array 26.

In an exemplary embodiment, the optical delay line(s) 48 are formed by wrapping approximately two hundred and ten meters (210 m) of optical fiber around the circumference of a three and one-half inch (3.5") diameter pipe. Each coil 33 of the SOS sensing device 24 is formed by wrapping one hundred and two meters (102 m) of optical fiber around the circumference of the pipe in a single layer. The optical fiber is wrapped using approximately twenty-five grams (25 g) of tension on the fiber. Each turn of the coil 33 is separated from adjacent coils by a fifteen micron ($15\mu$) gap. Adjacent coils in the SOS sensing array 24 are spaced approximately eighteen inches (18") apart, center to center. The velocity sensing array 26 is formed in like manner, except that each coil comprises seven layers rather than a single layer, and adjacent coils are spaced approximately one and eight tenths of an inch (1.8") apart, center to center. In both sensing arrays, the FBGs are spliced in the section of optical fiber that extends in a helical fashion between adjacent coils, or between a coil and a delay line, etc. Each FBG and the splices that tie the FBG into the optical fiber are laid on an isolator pad, as previously noted.

FIG. 6 illustrates an embodiment of an instrument 100 used to interrogate the sensing arrays 24, 26 of flow meter 22 of FIG. 2. A preferred embodiment of instrument 100 is a two beam interferometer. Optical source 102 produces a series of discrete light pulses 104, either by gating the light on and off or pulsing the drive current of the laser. Light pulses 104 are directed down fiber 106 to a first coupler 108. Coupler 108 splits pulse 104 into two and directs the two pulses along two independent paths 110, 112. Path 110 includes a phase modulator device 114 that imparts a phase modulation carrier on the pulse that travels along path 110. Path 112 includes a time delay, shown as a length of coiled optical fiber 116, that provides a known differential time-of-flight between the two paths 110, 112. It is advantageous to match the differential time-of-flight between the two paths 110, 112 with the nominal round trip time-of-flight of the sensor fiber coils $32(a)$–$32(j)$ as will be more fully described herein below. Coupler 118 combines the two pulses 120, 122, a signal pulse and a reference pulse, onto fiber 124. Pulse 122 includes a phase modulation carrier and pulse 120 lags pulse 122 by a period equivalent to the differential time delay between paths 110 and 112. Depending on the sensor array design, an optional optical amplifier 123 may be positioned within the fiber string. The two pulses 120, 122 are directed through a directional coupler 126, which may comprise any number of devices, such as an optical splitter or an optical circulator as shown in FIG. 6, and is further directed into a fiber optic cable 30 to the sensing arrays 24, 26 of flow meter 22. The pulses 120, 122 reach the sensing arrays 24, 26 and pass through the various windings of time delay coil 48, sensor fiber coils 32a–32j, and optical reflective devices 46a–46k, shown as FBGs (fiber Bragg gratings). As described hereinabove, the gratings 46a–46k are designed to reflect a small amount of the pulses back up the fiber optic or telemetry cable 30 to the optical circulator 126 while allowing the remainder of the pulses to pass to successive sensor fiber coils and gratings. In the embodiment shown, all of the gratings are designed to reflect the same wavelength, $\lambda_1$, although gratings written at different wavelengths are also contemplated by the present invention, as described earlier. As will be described more fully below, the portion of the pulses 122, 120 is reflected by each of the gratings 46a–46k and is directed to optical circulator 126. Optical circulator 126 directs each of the return signals to photo receiver 130 and onto a demodulator or an interrogator 132.

In the embodiment shown in FIG. 6, pulses 120, 122 first go through a time delay loop 48 and then impinge upon the first grating 46(a). Time delay loop 48 is so positioned at the beginning of the flow meter to mitigate interference by non-grating produced reflections of pulses 120, 122, such as those created by connectors 149 or other known reflection producing devices. For instance, if connector 149 creates a small reflection, say –40 dB (0.01%), it will impinge upon the photo receiver 130, and this reflection, if not sufficiently time separated, would corrupt the signal from the gratings 46(a) and 46(b) used to interpret sensor 32(a). Time delay loop 48 is therefore sized to provide a sufficient delay to allow the connector 149 induced reflections of pulses 122 and 120 to return before the first, non-interferometric pulse returns. In addition, a similar time delay coil 48 is positioned at the end of the optical fiber string to allow any reflections from the fiber termination 153 to not corrupt the reflected signals used to interpret sensor 32(j).

In operation, a portion of the first pulse 122 to reach grating 46(a) is reflected back to circulator 126 first and arrives at photo receiver 130 first, and is referred to (for explanation purposes) as the first pulse returning from the first grating. As described above, the majority of light from the first pulse 122 passes through the low reflectivity of first grating 46(a) and through the optical fiber of the first sensor 32(a) to the second grating 46(b). A small amount of the optical power of pulse 122 is reflected by grating 46(b) back through optical cable 30 and onto photo receiver 130 and is referred to as the first pulse returning from the second grating. The returning first pulse from the second grating arrives at the photo receiver 130 at a time equal to twice the single pass (double-pass) time-of-flight of the sensor fiber that makes up first sensor 32(a) relative to the first return pulse from the first grating. The time delay of the double-pass is established to a known quantity and is controlled by, among other things, the length of the fiber in the sensor loop, the type of fiber, and the wavelength of the optical pulse. The remainder of the optical energy of pulse 122 travels along the optical fiber of flow meter 22 and encounters gratings 46(c)–46(k) and sensor coils 32(b)–32(j) and reflects back successive return pulses to optical receiver 130.

Similarly, pulse 120 (the second pulse) follows pulse 122 by a time delay equal to the time differential between paths 110 and 112. Pulse 120 encounters gratings 46(a)–46(k) and sensor coils 32(a)–32(j) and reflects back successive return pulses to optical receiver 130 at a consistent time lag behind the reflected pulses from first pulse 122. In this manner, two separate pulses are received by the photo receiver 130 from each of the gratings 46(a)–46(k) at a consistent time delay from one another. Because the differential time-of-flight between the two paths 110, 112 and the double-pass time-of-flight of a nominal sensor coil 32 are equivalent, the first pulse returning from the second grating and the second pulse returning from the first grating arrive at the photo receiver at the same time, thereby creating an optical interference pattern.

The present invention enables one to detect signals of interest relating to pressure fluctuations in the pipe as described above by the examination and interpretation of the interference patterns. These interference patterns are created by the arrival of the pairs of reflected pulses generated from a series of pulses 104 at the photo receiver 130 over relatively short periods of time. Although the present invention does not determine pressure within the pipe, pressure fluctuations inside the pipe do indeed influence the sensor coils. The pressure fluctuations shorten, lengthen or otherwise strain the optical fibers that make up the sensor coils 32(a)–32(j), thereby effectively changing the nominal time delay of the sensor fiber coils and causing a commensurate phase shift between pulse reflections from the pair of gratings that bracket those sensor fiber coils. For each pulse 104 emitted by optical source 102, the photo receiver 130 receives a pair of reflected pulses, one each from pulses 122 and 120, from each of the gratings 46(a)–46(k). These pulses are then interpreted by interrogator 132 to derive information about the pressure fluctuations in the pipe in the form of a phase shift between the interfering pulses for each pulse 104 generated. In practice, the optical interference is converted to electrical signals by known methods by way of a square law photo detector, and the phase shifts induced into the interfering pulses 122 by straining of the sensor fiber coils 32(a)–32(j) are extracted by the interrogator 132 in a meaningful (i.e. electronic signal) way.

Figure 7:
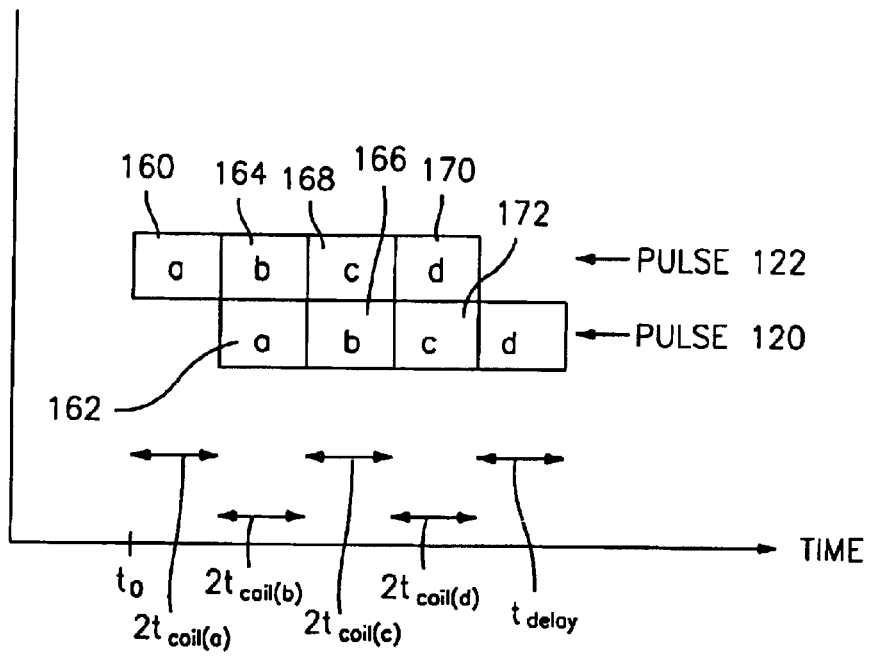
FIG. 7 is a graphical representation of reflected pulses from the various gratings of the sensing devices of the present invention.

This process is further described with reference to FIGS. 7 and 8, and initially the process for interrogating the first sensor 32(a) is described. The arrival at the photo receiver 130 of the first pulse (122) reflected from the first grating 46(a) (160) occurs at time $t_0$, and the first pulse reflection from the second grating 46(b) (164) occurs at $t=t_0+2t_{coil(a)}$, where $2t_{coil(a)}$ is the double-pass time of sensor 32(a). The arrival of the second pulse (120) reflected from grating 46(a) (162) occurs at $t=t_0+t_{delay}$, where $t_{delay}$ is the time delay of the difference between path 110 and path 112 created by the delay coil 116. Because $2t_{coil(a)} \sim= t_{delay}$ as mentioned previously, pulses 162 and 164 coincide, and interfere, at the photo receiver 130.

Figure 8:
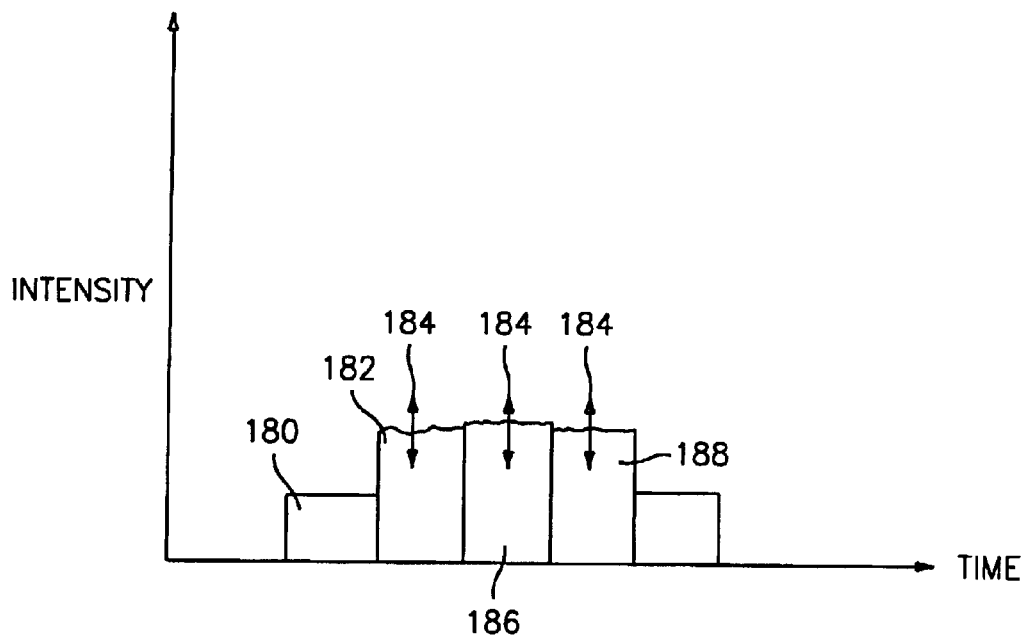
FIG. 8 is a graphical representation of the interference patterns of the reflected pulses shown in FIG. 7.

FIG. 8 shows the intensity of the reflected signals received by the photo receiver 130 as a function of time. It is important to note that during the time from $t=t_0$ until $t=t_0+t_{delay}$, only one pulse reflection (180, i.e., 160) impinges upon photo receiver 130 and no optical interference takes place. However, from $t \sim= t_0+t_{delay}$ until $t \sim= t_0+t_{delay}+2t_{coil(a)}$, two pulses, the first pulse 122 reflecting from the second grating 46(b) (164) and the second pulse 120 reflecting from the first grating 46(a) (162), are coincident at the photo receiver (182) and, as noted, will optically interfere. The interference pattern is primarily influenced by the phase modulation carrier imparted to pulse 122 by phase modulator device 114 under the control of the interrogation electronics, and the signal of interest imparted by the sensor 32(a), which is indicative of the pressure induced strains in the sensor 32(a). This pressure induced strain will cause the intensity of the coincident pulse 182 to vary depending on the amount of interference (i.e., constructive or destructive), as depicted by arrow 184. In other words, the strain in the first sensor 32(*a*) produces a phase shift between the returning pulses 162 and 164. The phase modulation imparted onto pulse 122 and the subsequent demodulation by interrogator 132 is then used to extract a linear representation of this phase shift, which is indicative of pressure fluctuations in the pipe. A suitable phase modulation scheme may include many well-known techniques, such as phase generated carriers or active or passive homodynes. In one embodiment of the present invention, a phase modulation scheme employs a demodulator incorporated into instrument 100 that is manufactured by Optiphase, Inc. of Van Nuys, Calif. Note that the phase carrier modulation can be imparted to the returning second pulse 120 with similar effect.

The present invention uses the analysis described above to interrogate the remaining sensors 32(*b*)–32(*j*), again by analyzing the interference pattern created between coincident pairs of reflected pulses. For example, the interference pattern for the second sensor coil 32(*b*) is analyzed by comparing the phase shift between the second pulse reflected from the second grating 46(*b*) (166) and the first pulse reflected from third grating 46(*c*) (168), which occurs between the times of $t\sim=t_0+t_{delay}+2t_{coil(a)}$ and $t\sim=t_0+t_{delay}+2t_{coil(a)}+2t_{coil(b)}$. The intensity of the interference pattern for the second sensor 32(*b*) (186) is analyzed similarly to interference pattern 182 to discern the strain status of that sensor. Likewise, the interference pattern for the third sensor 32(*c*) (188) is analyzed by comparing the phase shift between the second pulse reflected from the third grating 46(*c*) (172) and the first pulse reflected from the fourth grating 46(*d*) (170) occurring from time $t\sim=t_0+t_{delay}+2t_{coil(a)}+2t_{coil(b)}$ to $t\sim=t_0+t_{delay}+2t_{coil(a)}+2t_{coil(b)}+2t_{coil(c)}$. The remaining sensors 32(*d*)–32(*j*) are similarly interrogated. Using such an interrogation scheme, the present invention is capable of a resolution of between about 0.1 to about 1 mRAD/√Hz and an update rate of about 60 KHz.

The present invention will now be described with reference to a single specific embodiment, although the scope of the present invention is not limited to a single embodiment. It should be understood that any of the features, characteristics, alternatives, or modifications described regarding a particular embodiment herein may also be applied, used, or incorporated with any other embodiment described herein. The optical source 102 of a typical embodiment of instrument 100 and flow meter 22 is a narrow band source comprising a continuous output distributed feedback (DFB) laser operating at a nominal wavelength of about 1545 nm with a line width that is approximately less than 1 MHz. An Integrated Optics Chip (IOC) is used to gate the light on and off to create the pulse 104. In this embodiment, the IOC is gated by a pulse generator mechanism to emit 1 μsec pulses 104, roughly every 16 μsec, onto fiber 106, as shown in FIG. 6. The path length difference between legs 110 and 112 is sized such that the pulses 120, 122 are 1 μsec apart. In such a configuration, the leading edge of pulse 120 abuts the trailing edge of pulse 122. As the pulses 120, 122 exit coupler 118, they enter optical amplifier 123 to boost the optical power of the pulses to approximately 100 mW peak and travel along optical cable 30. A portion of optical cable 30 is typically installed with the production pipe 12 (FIG. 1) and comprises a pure silica core hardened for such an installation, as described in U.S. patent application Ser. No. 09/121,468 to Bonja et al., filed Jul. 23, 1998, entitled "Fiber Optic Cable for Use in Harsh Environments," which is incorporated herein by reference. As described above, delay coil 48 comprises approximately two hundred ten meters (210 m) of optical fiber and nominally provides slightly more than a 2 μsec double-pass delay to separate the connector 149 reflections (and other extraneous reflections) from the reflections of pulses 120, 122 from FBGs 46(*a*)–46(*k*). FBGs 46(*a*)–46(*k*) are tailored to reflect light having a wavelength of about 1545 nm with about a 2 to 4 nm bandwidth. Each of the gratings are written to reflect roughly one-quarter of one percent (0.25%) of the total optical power. In the embodiment described, the gratings are tailored to increase their specific reflectivity to accommodate for optical losses that occur between grating 46(*a*) (about 0.25%) and grating 46(*k*) (about 0.45%). Each of the sensor fiber coils 32(*a*)–32(*j*) are wrapped and positioned on a pipe 12 (as shown in FIG. 2) as described above with approximately 102 meters of optical fiber to provide a double-pass delay of 1 μsec each.

Although the invention has been described and illustrated with respect to exemplary embodiments thereof, the foregoing and various other additions and omissions may be made therein and thereto without departing from the spirit and scope of the present invention.

What is claimed is:

1. A method of interrogating at least one fiber optic sensor, the sensor coupled to a pipe and sensing at least one parameter of a fluid in the pipe, the method comprising:
   generating successive narrow band light pulses;
   splitting the light pulses into first light pulses and second light pulses;
   delaying the second light pulses a known time period relative to the first pulses;
   combining the first and second light pulses onto a single optical fiber;
   directing the first and second light pulses through a first periodic grating of low reflectivity, through the optical sensor and through a second periodic grating of low reflectivity;
   receiving reflected first light pulses and reflected second light pulses from the first grating;
   receiving reflected first light pulses and reflected second light pulses from the second grating; and
   determining a phase shift between the reflected first light pulses from the second grating and the reflected second light pulses from the first grating, wherein the phase shift is indicative of a difference in arrival times of the reflected first light pulses from the second grating and the reflected second light pulses from the first grating.

2. The method of claim 1, further comprising:
   comparing the phase shift from the successive pulses; and
   determining a change in magnitude of the measured parameter from the comparison of the successive phase shifts.

3. The method of claim 1, further comprising impressing a modulation carrier onto the first light pulses.

4. The method of claim 1, further comprising directing the first and second light pulses along the optical fiber and through an optical splitter.

5. The method of claim 1, wherein the receiving reflected first light pulses and reflected second light pulses from the first grating and receiving reflected first light pulses and reflected second light pulses from the second grating comprises directing the reflected first and second pulses through an optical splitter and impinging the reflected first and second pulses upon an optical receiver.

6. The method of claim 1, further comprising directing the second light pulses through a time delay device.

7. The method of claim 1, wherein the known time period of delay is about the same as the double-pass time of the light pulses through the sensor.

8. The method of claim 1, wherein generating light pulses comprises using a continuous output distributed feedback laser and an integrated optics chip.

9. The method of claim 1, wherein generating light pulses comprises generating light pulses of about 1 µsec in duration.

10. The method of claim 1, wherein the known time period is about 1 µsec.

11. The method of claim 1, wherein the first and second periodic gratings are tailored to reflect light having a wavelength of about 1545 nm.

12. The method of claim 1, wherein the successive pulses are generated at about 16 µsec intervals.

13. An apparatus for interrogating at least one interferometric fiber optic sensor, the sensor optically connected between first and second reflective gratings and further coupled to a pipe, the apparatus comprising:
    a narrow band light source;
    a first optical coupler optically connected to the light source and adapted to split a light pulse emitted from the narrow band light source into first and second light pulses;
    a first optical path adapted to receive and delay second light pulses relative to first light pulses;
    a second optical path adapted to receive first light pulses;
    a second coupler optically connected to the first and second optical paths;
    a directional coupler optically connected to the second coupler;
    an optical transmission cable optically connected to the directional coupler and optically connected to the first reflective grating of the at least one interferometric fiber optic sensor;
    a photo receiver optically connected to the directional coupler; and
    signal processing circuitry coupled with the photo receiver and adapted to determine a phase shift between reflected first light pulses from the second reflective grating and reflected second light pulses from the first reflective grating.

14. The apparatus of claim 13, wherein the second optical path includes a modulation carrier device.

15. The apparatus of claim 13, further comprising an optical amplifier optically connected thereto.

16. The apparatus of claim 13, wherein the time delay has an optical length and the sensor has a nominal optical length and wherein the optical length of the time delay is substantially the same as twice the nominal optical length of the sensor.

17. The apparatus of claim 13, wherein the pipe includes a fluid flowing therethrough, and wherein the at least one sensor comprises:
    an acoustic signal sensing array having a plurality of sensors, each sensor wrapped a plurality of turns around a circumference of the pipe;
    wherein optical power sent from the light source connected to the apparatus travels into the acoustic signal sensing array and reflected pulses are received by the photo receiver relating to an acoustic signal;
    a local pressure variation sensing array having a plurality of sensors, each sensor wrapped a plurality of turns around the circumference of the pipe; and
    wherein optical power sent from the light source connected to the apparatus travels into the acoustic signal sensing array and reflected pulses are received by the photo receiver relating to the local pressure variation.

18. The apparatus of claim 17, wherein the reflective gratings reflect the same wavelength.

19. The apparatus of claim 18, wherein the reflective gratings are fiber Bragg Gratings.

20. The apparatus of claim 17, wherein the sensors within the acoustic signal sensing array are spaced to sense acoustic signals traveling at the speed of sound through the fluid, and the first signal relating to the acoustic signals can be used to determine a speed of sound for the fluid within the pipe.

21. The apparatus of claim 17, wherein the sensors within the acoustic signal sensing array are spaced a known or determinable distance or distances apart.

22. The apparatus of claim 21, wherein the sensors within the acoustic signal sensing array are spaced equidistant.

23. The apparatus of claim 17, wherein the sensors within the local pressure variation sensing array are spaced to sense local pressure variations traveling with the fluid flow, and the reflected pulses relating to the local pressure variations can be used to determine a velocity for the fluid flow within the pipe.

24. The apparatus of claim 23, wherein the sensors within the local pressure variation sensing array are spaced a known or determinable distance or distances apart.

25. The apparatus of claim 24, wherein the sensors within the local pressure variation sensing array are spaced equidistant.

26. The apparatus of claim 13, wherein the directional coupler comprises an optical circulator.

27. The apparatus of claim 13, wherein the light source comprises a continuous output distributed feedback laser and an integrated optics chip to gate the light on and off at predetermined intervals.

28. The apparatus of claim 27, wherein the intervals are about 1 µsec in duration.

29. The apparatus of claim 27, wherein the intervals are about 16 µsec apart.

30. The apparatus of claim 13, wherein the gratings are tailored to reflect light having a wavelength of about 1545 nm.

31. The apparatus of claim 13, wherein the optical length of the time delay is substantially equal to a nominal optical length of the sensor.

32. A method for sensing fluid flowing within a pipe, comprising:
    placing at least one optical sensor on an outside surface of the pipe, wherein the sensor is bound by a pair of first and second reflectors;
    creating a first light pulse and a second light pulse from an incident narrow band light pulse, wherein the second light pulse is delayed by a time period relative to the first pulse;
    directing the first and second light pulses to the sensor;
    combining the first light pulse reflected from the second reflector and the second light pulse reflected from the first reflector; and
    determining a phase shift between the reflected first and second light pulses to determine a parameter of the fluid within the pipe, wherein the phase shift is indicative of a difference in arrival time between the reflected first and second light pulses.

33. The method of claim 32, wherein the sensor comprises at least one wrap of fiber optic cable.

34. The method of claim 32, further comprising imparting a modulation carrier onto the first light pulse.

35. The method of claim 32, wherein the second light pulse is delayed relative to the first pulse by splitting and recombining the incident light pulse prior to directing the first and second light pulses to the sensor.

36. The method of claim 35, wherein the second light pulse is delayed relative to the first pulse by passing the second light pulse through an optical time delay.

37. The method of claim 32, wherein the first and second light pulses are directed to the sensor along an optical pathway.

38. The method of claim 37, wherein the first light pulse reflected from the second reflector and the second light pulse reflected from the first reflector are combined on the optical pathway.

39. The method of claim 38, wherein the optical pathway is coupled to a photo receiver.

40. The method of claim 39, wherein the optical pathway is coupled to the photo receiver by an optical circulator.

41. The method of claim 40, wherein the photo receiver is coupled to instrumentation to determine the phase shift.

42. The method of claim 32, wherein the sensor comprises an optical sensor having a double-pass optical time-of-flight between the first and second reflectors, and wherein the time period is approximately equal to the double-pass time-of-flight.

43. The method of claim 32, wherein the incident light pulse is created by a gateable distributed feedback laser.

44. The method of claim 32, wherein the light pulse has a duration approximately equal to the time period.

45. The method of claim 32, further comprising a serially-connected plurality of sensors each bound by a pair of first and second reflectors.

46. The method of claim 45, wherein each sensor comprises its own unique pair of first and second reflectors.

47. The method of claim 46, wherein each pair of reflectors reflects light of a wavelength different from the other pairs of reflectors.

48. The method of claim 45, wherein each pair of first and second reflectors is not unique to a sensor such that the first reflector of a first sensor comprises the second reflector of a second sensor adjacent the first sensor.

49. The method of claim 48, wherein each of the pairs of reflectors reflect light of a common wavelength.

50. The method of claim 45, wherein the sensors detect acoustic disturbances in the fluid that travel at the speed of sound in the fluid.

51. The method of claim 45, wherein the sensors detect pressure disturbances in the fluid that travel at the speed of the fluid.

52. The method of claim 45, wherein the sensors comprise at least one wrap of fiber optic cable.

53. An apparatus for sensing fluid flowing within a pipe, comprising:

a narrow band light source for emitting narrow band incident light capable of being split into first and second light pulses;

a first and second optical path each having a first end and a second end, wherein the first ends are optically coupled to the narrow band light source, wherein the second ends are optically coupled to an optical transmission line, and wherein second pulses of the Incident light travels through the second path at a time delay relative to first pulses of the incident light traveling through the first path;

at least one optical sensor coupled to the optical transmission line, wherein the sensor is placed on an outside surface of the pipe to detect acoustic disturbances within the fluid, and wherein the sensor is bounded by a pair of first and second reflectors;

a photo receiver optically coupled to the transmission line; and signal processing circuitry coupled with the photo receiver and adapted to determine a phase shift between reflected light pulses from the second reflective grating and reflected second light pulses from the first reflective grating.

54. The apparatus of claim 53, wherein the sensor comprises at least one wrap of fiber optic cable.

55. The apparatus of claim 53, further comprising a modulator for imparting modulation to first light pulses traveling down the first path.

56. The apparatus of claim 53, wherein the time delay is created by an optical delay element in the second path.

57. The apparatus of claim 56, wherein the optical delay element comprises a delay coil.

58. The apparatus of claim 53, wherein the transmission line is coupled to the photo receiver by an optical circulator.

59. The apparatus of claim 53, wherein the first ends are coupled to a first coupler, and the second ends are coupled to a second coupler.

60. The apparatus of claim 53, wherein the sensor has a double-pass optical time-of-flight between the first and second reflectors, and wherein the time delay is approximately equal to the double-pass time-of-flight.

61. The apparatus of claim 53, wherein the narrow band light source comprises a gateable distributed feedback laser.

62. The apparatus of claim 53, wherein the narrow band light source emits at least one pulse with a duration equal to the time delay.

63. The apparatus of claim 53, wherein the optical transmission line includes an optical amplifier.

64. The apparatus of claim 53, further comprising a serially-connected plurality of sensors each bound by a pair of first and second reflectors.

65. The apparatus of claim 64, wherein each sensor comprises its own unique pair of first and second reflectors.

66. The apparatus of claim 65, wherein each pair of reflectors reflects light of a wavelength different from the other pairs of reflectors.

67. The apparatus of claim 64, wherein each pair of first and second reflectors is not unique to a sensor such that the first reflector of a first sensor comprises the second reflector of a second sensor adjacent the first sensor.

68. The apparatus of claim 67, wherein each of the pairs of reflectors reflect light of a common wavelength.

69. The apparatus of claim 64, wherein the acoustic disturbances in the fluid travel at the speed of sound in the fluid.

70. The apparatus of claim 64, wherein the serially-connected plurality of sensors are positioned to measure acoustic disturbances at different axial locations along the pipe.

71. The apparatus of claim 64, wherein the sensors comprise at least one wrap of fiber optic cable.

* * * * *